United States Patent
Yudovin-Farber et al.

(10) Patent No.: US 10,005,236 B2
(45) Date of Patent: Jun. 26, 2018

(54) CATIONIC POLYMERIZABLE COMPOSITIONS AND METHODS OF USE THEREOF

(71) Applicant: STRATASYS LTD., Rehovot (IL)

(72) Inventors: Ira Yudovin-Farber, Rehovot (IL); Eduardo Napadensky, Netanya (IL); Avi Levy, Petach Tikva (IL); Daniel Dikovsky, Rehovot (IL)

(73) Assignee: STRATASYS LTD., Rehovot (IL)

( * ) Notice: Subject to any disclaimer, the term of this patent is extended or adjusted under 35 U.S.C. 154(b) by 845 days.

(21) Appl. No.: 14/381,628

(22) PCT Filed: Feb. 28, 2013

(86) PCT No.: PCT/IL2013/050176
§ 371 (c)(1),
(2) Date: Aug. 28, 2014

(87) PCT Pub. No.: WO2013/128452
PCT Pub. Date: Sep. 6, 2013

(65) Prior Publication Data
US 2015/0056421 A1 Feb. 26, 2015

Related U.S. Application Data

(60) Provisional application No. 61/605,467, filed on Mar. 1, 2012.

(51) Int. Cl.
*B29C 67/00* (2017.01)
*C09D 11/30* (2014.01)
*C09D 11/101* (2014.01)
*C08G 59/68* (2006.01)
*C08G 65/10* (2006.01)
*B29C 64/112* (2017.01)
*B33Y 10/00* (2015.01)
*B33Y 70/00* (2015.01)
*B29L 9/00* (2006.01)

(52) U.S. Cl.
CPC ........ *B29C 67/0059* (2013.01); *B29C 64/112* (2017.08); *C08G 59/68* (2013.01); *C08G 65/105* (2013.01); *C09D 11/101* (2013.01); *C09D 11/30* (2013.01); *B29L 2009/00* (2013.01); *B33Y 10/00* (2014.12); *B33Y 70/00* (2014.12); *Y10T 428/24851* (2015.01)

(58) Field of Classification Search
None
See application file for complete search history.

(56) References Cited

U.S. PATENT DOCUMENTS

| 4,156,035 | A | | 5/1979 | Tsao et al. |
|---|---|---|---|---|
| 5,639,413 | A | * | 6/1997 | Crivello .............. B29C 67/0066 264/401 |
| 7,300,619 | B2 | * | 11/2007 | Napadensky ........... B29C 41/48 264/401 |
| 2002/0086161 | A1 | | 7/2002 | Smetana et al. |
| 2007/0205528 | A1 | | 9/2007 | Patel et al. |
| 2008/0103226 | A1 | | 5/2008 | Xu |
| 2010/0066791 | A1 | | 3/2010 | Jeremic et al. |
| 2010/0331478 | A1 | | 12/2010 | Claes |
| 2011/0042859 | A1 | | 2/2011 | Patel et al. |
| 2011/0180952 | A1 | | 7/2011 | Napadensky |

FOREIGN PATENT DOCUMENTS

| EP | 1942159 | 7/2008 |
|---|---|---|
| EP | 2233541 | 9/2010 |

OTHER PUBLICATIONS

Supplementary European Search Report App. No. EP 13755815 dated Oct. 20, 2015.

* cited by examiner

*Primary Examiner* — Gerard Higgins
*Assistant Examiner* — Sathavaram I Reddy
(74) *Attorney, Agent, or Firm* — Pearl Cohen Zedek Latzer Baratz LLP

(57) ABSTRACT

An inkjet printing method and inkjet compositions are disclosed. The method includes selectively depositing by inkjet printing, layer by layer, a first composition and a second composition onto a receiving media from different dispensers to form polymerizable deposited layers. The first composition includes one or more free-radical polymerizable compounds and a cationic photoinitiator and is devoid of compounds able to undergo cationic photopolymerization within the first composition. The second composition includes one or more cationic polymerizable compounds and is devoid of cationic photoinitiators. At least one of the compositions includes a radical photoinitiator. The method further includes exposing the deposited layers to actinic radiation to initiate polymerization of the free-radical polymerizable compounds and the cationic polymerizable compounds within the deposited layers.

12 Claims, No Drawings

CATIONIC POLYMERIZABLE COMPOSITIONS AND METHODS OF USE THEREOF

CROSS-REFERENCE TO RELATED APPLICATIONS

This application is a National Phase Application of PCT International Application No. PCT/IL2013/050176, International Filing Date Feb. 28, 2013, claiming priority of U.S. Provisional Patent Application No. 61/605,467, filed Mar. 1, 2012, all of which which are hereby incorporated by reference.

BACKGROUND

Three-dimensional (3D) inkjet printing is a known process for building three dimensional objects by selectively jetting building materials, for example, photo polymerizable compositions, via ink-jet printing head nozzles onto a printing tray in consecutive layers, according to pre-determined image data. Actinic radiation, for example, ultraviolet (UV) radiation is directed onto the deposited layers of photopolymerizable compositions to solidify or stabilize the layers.

A drawback of 3D printing of UV curable compositions is the tendency of the liquid formulation to solidify on the printing head nozzle plate during the jetting process due to UV reflections, heat or both. Nozzle plate contamination is more severe with compositions containing cationically polymerizable components since cationic polymerization is not inhibited by oxygen and is accelerated by heat. Additionally, once the cationic polymerization mechanism has been initiated, it continues even when not exposed to light. The use of cationic polymerizable compositions is desirable, however, due to certain valuable properties, such as, for example, relatively low shrinkage, high thermal resistance and high chemical and solvent resistance of such compositions.

SUMMARY

Features of certain embodiments may be combined with features of other embodiments; thus certain embodiments may be combinations of features of multiple embodiments.

There is thus provided according to embodiments of the invention an inkjet printing method. The method includes selectively depositing by inkjet printing, layer by layer, a first composition and a second composition onto a receiving media from different dispensers to form polymerizable deposited layers, wherein the first composition comprises one or more free-radical polymerizable compounds and a cationic photoinitiator and is devoid of compounds able to undergo cationic photopolymerization within the first composition, and the second composition comprises one or more cationic polymerizable compounds and is devoid of cationic photoinitiators, and at least one of the first and the second compositions comprises a radical photoinitiator; and further includes exposing the deposited layers to actinic radiation to initiate polymerization of the one or more free-radical polymerizable compounds and the one or more cationic polymerizable compounds within the deposited layers.

According to embodiments of the invention, the first and second compositions are dispensed so as to form a substantially isotropic distribution within each of the deposited layers. According to embodiments of the invention, the first and second compositions are dispensed such that in each of the deposited layers, a ratio between deposited droplets of the first composition and deposited droplets of the second composition is between about 25% first composition to about 75% second composition and about 75% first composition to about 25% second composition. According to embodiments of the invention, the ratio in at least one layer of the deposited layers is different to the ratio in at least one other of the deposited layers.

There is thus provided according to embodiments of the invention a printing composition. The printing composition comprises a free radical composition having one or more free-radical polymerizable compounds and a cationic photoinitiator and is not polymerizable by a cationic polymerization mechanism; and a cationic composition having one or more cationic polymerizable compounds and devoid of cationic photoinitiators. At least one of the free radical and the cationic compositions comprises a radical photoinitiator, and the free radical composition and the cationic composition are kept separate from each other prior to and during dispensing. In some embodiments, the free radical composition comprises at least one acrylic monofunctional monomer at a concentration of at least 20% by weight relative to the weight of the free radical composition and an acrylic oligomer at a concentration of at least 20% by weight relative to the weight of the free radical composition. According to some embodiments, the cationic composition comprises 3,4-Epoxy cyclohexyl methyl-3,4 epoxy cyclohexyl carboxylate at a concentration of at least 50% by weight relative to the weight of the cationic composition. In some embodiments, the 3,4-Epoxy cyclohexyl methyl-3,4 epoxy cyclohexyl carboxylate constitutes above 90% by weight of the cationic composition. In some embodiments, the cationic photo-initiator comprises Aryliodunium Hexaflouoroantimonate. In some embodiments the cationic composition further comprises acrylic polymerizable compounds. According to some embodiments, the cationic polymerizable compound is selected from cycloaliphatic epoxides, vinyl ethers, cyclic sulphides, lactones and siloxanes. In some embodiments, the free radical composition further comprises one or more hydroxyl containing compounds, which do not polymerize in the absence of a cationic photopolymerizable compound.

There is further provided according to embodiments of the invention a printing material kit for inkjet printing. The kit comprises a first container storing a first composition, the first composition comprising one or more free-radical polymerizable compound, and a cationic photoinitiator, the first composition not being polymerizable by a cationic reaction mechanism; and a second container storing a second composition, the second composition comprising one or more cationic polymerizable compounds and devoid of cationic photoinitiators.

In some embodiments, the first composition of the kit comprises at least one acrylic monofunctional monomer at concentration of at least 20% by weight relative to the weight of the first composition and at least one acrylic oligomer at a concentration of at least 20% by weight relative to the weight of the first composition. In some embodiments, the second composition of the kit comprises a di-functional silicon containing resin. In some embodiments, the second composition of the kit comprises a cationic photo-sensitizer.

There is further provided according to embodiments of the invention a three-dimensional object. The three-dimensional object comprises a multiplicity of polymerized deposited layers formed by selectively depositing by inkjet printing, layer by layer, a first composition and a second composition onto a receiving media from different dispensers to form polymerizable deposited layers, wherein the first composition comprises one or more free-radical polymerizable compounds and a cationic photoinitiator and is not polymerizable by a cationic mechanism, and the second composition comprises one or more cationic polymerizable compounds and is devoid of cationic photoinitiators, and at least one of the first and the second compositions comprises a radical photoinitiator, and exposing the polymerizable deposited layers to actinic radiation to initiate polymerization of the one or more free-radical polymerizable compounds and the one or more cationic polymerizable compounds.

There is further provided according to embodiments of the invention a solid composition formed by selectively depositing, layer by layer, the compositions detailed above so as to form deposited layers, each having a pattern with a substantially isotropic distribution of the free radical composition and the cationic composition and exposing the deposited layers to actinic radiation to initiate polymerization of the one or more free-radical polymerizable compounds and the one or more cationic polymerizable compounds within the deposited layers. in some embodiments, The solid composition exhibits a heat deflection temperature (HDT) of above 100 C.°.

DETAILED DESCRIPTION

In the following detailed description, numerous specific details are set forth in order to provide a thorough understanding of the invention. However it will be understood by those of ordinary skill in the art that the embodiments of the present invention may be practiced without these specific details. In other instances, well-known methods, procedures and components have not been described in detail so as not to obscure the present invention.

Embodiments of the invention are directed to an inkjet printing method and compositions that replace an inkjet composition containing both acrylic and epoxide polymerizable components. While the acrylic-based component produces negligible contamination of the nozzle plate due to oxygen inhibition, the epoxy-based component tends to polymerize on the nozzle plate within a few hours of printing, leading to rapid contamination of the printing head. According to embodiments of the invention instead of using a single composition, two compositions, each deposited from a different printing head are used. Both compositions are substantially "non-reactive" when passing through the inkjet printing head and nozzle plate, and therefore the inkjet heads are not clogged by polymerization during the printing process.

Embodiments of the present invention are directed to photocurable or polymerizable compositions suitable for inkjet printing that do not clog the nozzle plate of the printing heads. A first composition may comprise one or more free-radical polymerizable compounds or components which do not polymerize by cationic mechanism, and a cationic photoinitiator, and be devoid of compounds able to undergo cationic polymerization within the first composition. A second composition may contain one or more cationic polymerizable compounds or components and be devoid of or substantially free of cationic photoinitiators. The cationic composition may optionally include acrylic monomers. The compositions are deposited from separate printing heads, to be digitally combined or mixed after printing within each deposited layer.

The first composition may further comprise hydroxyl containing compounds, which do not polymerize in the absence of a cationic photopolymerizable compound such as epoxy.

Both the first and the second compositions or only one of them may further include a free radical polymerization photoinitiator. The compositions may further include additional substances such as inhibitors, photosensitizers, surfactants, toughening agents, pigments, dyes, fillers and others.

The first composition, namely the radical composition may include a combination of acrylic monomers and oligomers with a degree of purity high enough not to inhibit cationic polymerization. It has been found that alkaline and/or sulfur impurities significantly inhibit the cationic polymerization reaction.

For ease of explanation, the first composition may be referred to as a "radical composition" and the second composition may be referred to as a "cationic composition". In some embodiments, the compositions are for use in two dimensional inkjet printing and in other embodiments, the compositions are for use in three dimensional (3D) inkjet printing. These two compositions may be regarded as a two-part composition for inkjet printing, referred to herein as a printing composition, specially designed for a method including selectively depositing each of the first and second compositions onto a receiving media, e.g. a printing tray, from different dispensers to form a deposited layer comprising droplets of both compositions and exposing the deposited layer to actinic radiation to initiate polymerization or partial polymerization of the one or more free-radical polymerizable components of the first composition and the one or more cationic polymerizable components of the second composition with the layer.

Accordingly, embodiments of the present invention are directed to a method of forming a three dimensional object by inkjet printing. The method includes selectively depositing, layer by layer, a first composition and a second composition onto a receiving media, e.g. printing tray, from two different dispensers to form polymerizable deposited layers, wherein the first composition comprises one or more free-radical polymerizable compounds which do not polymerize by cationic mechanism and a cationic photoinitiator, and is devoid of compounds able to undergo cationic polymerization within the first composition, and the second composition comprises one or more cationic polymerizable compounds and is devoid of cationic photoinitiators, and at least one of the first and the second compositions comprises a radical photoinitiator, and exposing the deposited layers to actinic radiation to initiate polymerization of the one or more free-radical polymerizable compounds and the one or more cationic polymerizable compounds within the deposited layers. The method may further include a post-printing heating operation to strengthen the final object.

According to embodiments of the invention, the first and the second compositions are deposited in patterns that enable the cationic photoinitiator in the first composition to diffuse into the second composition and in such a way enabling the polymerizable components of the second composition to polymerize or at least partially polymerize upon exposure to radiation, such as UV radiation. For example, an Objet® Connex500™ 3D printing system of Stratasys Ltd. allows separate jetting of two or more materials in a single layer. Other printing systems may be used.

In some embodiments, a first composition of the printing composition may include one or more free-radical polymerizable compounds or components which do not polymerize by cationic mechanism and a cationic photoinitiator and be devoid of or substantially free of cationic compounds or compounds able to undergo cationic polymerization within the first composition and is further substantially free of a radical photoinitiator, and a second composition includes one or more cationic polymerizable compounds or components and a radical photoinitiator and is devoid of or substantially free of cationic photoinitiators. In such embodiments, the first and the second compositions are deposited in a pattern that enables the radical photoinitiator in the second composition to diffuse into the first composition and the cationic photoinitiator in the first composition to diffuse into the second composition. In such a way, the polymerizable components of the first and second compositions polymerize or at least partially polymerize on the printing tray upon exposure to UV radiation or other actinic radiation, to form a layer of solid or semi-solid material.

By separating the cationic photoinitiator and the cationic polymerizable components, and optionally the radical photoinitiator and radical polymerizable components, the jetted cationic and radical compositions will be substantially non-reactive before and during jetting, and thus indirect radiation originating from reflections from the printing tray or other mechanical parts will not polymerize these non-reactive compositions on the printing head nozzle plate. It has been found that the rate of formation of a film of polymerized radical component on the nozzle plate due to radiation reflections is significantly lower than the rate of formation of a film of polymerized cationic components on the nozzle plate. The lower rate of film formation for a radical component may be due to the radical polymerization mechanism, which is naturally inhibited by oxygen. Accordingly, in some embodiments, the first composition may include both free-radical polymerizable compounds or components and a radical photoinitiator and be reactive during jetting without interfering with the printing process.

Embodiments of the invention are further directed to a printing material kit suitable for inkjet printing. The kit may include a first container storing a first composition (the radical composition) and a second container storing a second composition (the cationic composition), wherein the first composition includes one or more free-radical polymerizable compounds or components which do not polymerize by cationic mechanism and a cationic photoinitiator and is free of cationic polymerizable compounds or components able to undergo cationic polymerization within the first composition, and optionally free of a radical photoinitiator; and the second composition includes one or more cationic polymerizable compounds or components and optionally a radical photoinitiator and is free of cationic photoinitiators. Both the radical and the cationic compositions or only one of them may further include a free radical polymerization photoinitiator.

The compositions may exhibit the following characteristics to operate satisfactorily within an inkjet printing system: viscosity values in the range of about 10-25 centipoise at a jetting temperature, usually in the range of 25° C.-120° C. to allow jetting through the inkjet nozzles; surface tension of about 26 to 32 Dyne/cm and Newtonian liquid behavior to allow continuous jetting of the liquid compositions; and reactivity to provide rapid polymerization of deposited thin layers of material when exposed to UV irradiation. In some embodiments, the first and second compositions are used in 3D printing, to produce a combined polymerized material with a heat distortion temperature (HDT) of above 100° C. In some embodiments, the polymerized material resulting from jetting of the first and the second compositions may exhibit an HDT of above 120° C. or above 140° C. Both the first and the second compositions may be prepared in any suitable manner, for example by mixing all the composition components together or by pre-mixing certain components and then mixing them with the remaining components.

Embodiments of the invention are directed to an inkjet printing method using the first and second compositions detailed herein. The method includes selectively depositing each of the compositions onto a receiving media, e.g. a printing tray, from different dispensers to form a layer and exposing the thus deposited layer to actinic radiation to initiate polymerization or at least partial polymerization of the one or more free-radical polymerizable components of the first composition and the one or more cationic polymerizable components of the second composition.

In some embodiments, the method may include building a three dimensional article by selectively dispensing, layer by layer, the first and second compositions, each from a different dispenser or printing head to form layers, corresponding to cross-sectional layers of a three dimensional article. According to some embodiments, each of the first and second compositions may be deposited in pre-designed patterns. The patterns may include a multi-layer pattern such that the image of a first layer may be designed to be complementary to the image of a subsequent layer. The pattern may be designed to enable maximal homogeneity between the first and second compositions within a layer and/or within two or more consecutive layers. Additionally or alternatively, the pattern may be designed such that there would be maximal contact between the first and second compositions. The pattern may include a "zigzag" pattern, any suitable interlaced pattern or a Chess board pattern. A different pattern may be created in at least two different layers. The interlaced patterns may overlap or be non-overlapping between successive layers.

The digital mode of printing, namely, deposition of the relative amounts of different materials (ratio between the first and second compositions) and their positioning within a layer according to the image data (i.e. layer pattern) can determine the physical and thermo-mechanical properties of the resulting polymerized material, for example, strength, shrinkage and thermal resistance. A desired property of the resulting three dimensional object is exhibiting minimal curling deformation. The curling deformation is the tendency of the edges of a base of the printed three dimensional object to lift off the printing tray. The curling may be quantified by printing for example a 10×10×230 mm bar for curling measurement (deformation bar) and measuring the gap between the printing tray/printing surface/other flat surface and the bottom surface of the printed deformation bar. Measurement may be done for example by a caliper measurement ruler, such as a ruler distributed by Absolute Digimatic Caliper, Mitutoyo, USA.

It has been surprisingly found that not only the ratio between the amount of the different materials forming each object layer is important in order to produce a part with desired properties. The manner or order in which the materials (first and second compositions) are combined is also important. It has been found that optimal results with respect to curling are obtained when mixing of the compositions is done in each layer and in a homogeneous, substantially isotropic way. It has been surprisingly found that minimal curling of the object being printed is achieved when depositing the acrylic composition (first composition) and the epoxy composition (second composition) in such a pattern that the combining of the two compositions occurs within each layer, layer by layer, and distribution of the two compositions within each layer is homogeneous and isotropic. With such a homogeneous and isotropic pattern the curling deformation may be around 1-2 mm.

The ratio between first and second compositions within a given layer may not necessarily be the same ratio as in the article or object as a whole. For example, a first layer may contain a larger quantity of the first composition and the second subsequent layer may contain a smaller portion of the first composition. The ratio between the first (radical) and second (cationic) compositions within the article may vary between about 25% to 75% by % droplets or dots of the total droplets of a layer (first composition) to about 75% to 25% by dots (second composition). For example, the digital print mode may include depositing the first and second compositions within a layer in equal quantities in a Chess board pattern (i.e. 50% by dots of the first composition (radical composition) and 50% by dots of the second composition (cationic composition). The chess board pattern may include a pattern of alternating areas where each area may represent a pixel, a square 2×2 pixels, a square of 4×4 pixels and any other area size. In another embodiment, the digital print mode may include depositing within a layer about 40% (by dots) radical composition and about 60% cationic composition, or vice versa.

In some embodiments, at least one layer of the 3D object being printed may be comprised of 100% first composition and 0% second composition. A given layer may be comprised of 25-100% first material and 0-75% second material.

It has been found that in certain cases, increasing the cationic portion within a deposited layer results in an increase of the HDT value of the combined polymerized material, while decreasing the cationic portion may lead to a decrease in the HDT value of the combined polymerized material. For instance, a digital mode that is based on about 60% cationic composition and about 40% radical composition may result in a photo-polymerized material having an HDT of about 140° C. and a digital mode that is based on about 50% cationic composition and about 50% radical composition may result in a photo-polymerized material having an HDT of about 125° C. Furthermore, it has been found that additional reduction in cationic composition ratio to about 25% cationic composition and about 75% respectively may decrease the HDT of the resulting photo-polymerized material to 75° C.

In some embodiments, the ratio between the first and the second composition is different in different layers. For example, the ratio may be different in consecutive layers or in different regions of the article. In some embodiments, the ratio between the first and second material may change gradually between successive layers or regions.

Free-Radical Polymerizable Components

The first composition or radical composition according to embodiments of the invention contains one or more free-radical polymerizable components or compounds which do not polymerize by cationic mechanism. The free-radical polymerizable component may include as the polymerizable reactive functional groups, a (meth)acrylic functional group. The term "(meth)acrylic" or "(meth)acrylate" refers to both acrylates and methacrylates. Free-radical polymerizable components may include (meth)acrylic monomers, (meth)acrylic oligomers, and any combination thereof. Other free-radical polymerizable compounds may include thiols, vinyl ethers and other reactive double bonds.

An acrylic oligomer is a functional acrylated molecule which may be, for example, polyesters of acrylic acid and methacrylic acid. Other examples of acrylic oligomers are the classes of urethane acrylates and urethane methacrylates. Urethane-acrylates are manufactured from aliphatic or aromatic or cycloaliphatic diisocyanates or polyisocyanates and hydroxyl-containing acrylic acid esters. Oligomers may be mono-functional or multi-functional (for example, di-, tri-, tetra-functional, and others). An example is a urethane-acrylate oligomer marketed by IGM Resins BV (The Netherlands) under the trade name Photomer-6010.

An acrylic monomer is a functional acrylated molecule which may be, for example, esters of acrylic acid and methacrylic acid. Monomers may be mono-functional or multi-functional (for example, di-, tri-, tetra-functional, and others). An example of an acrylic mono-functional monomer for the present invention is phenoxyethyl acrylate, marketed by Sartomer Company (USA) under the trade name SR-339. An example of an acrylic di-functional monomer is propoxylated (2) neopentyl glycol diacrylate, marketed by Sartomer Company (USA) under the trade name SR-9003.

Either the monomer or the oligomer might be polyfunctional, which are molecules which may provide enhanced crosslinking density. Examples of such molecules are Ditrimethylolpropane Tetra-acrylate (DiTMPTTA), Pentaerythitol Tetra-acrylate (TETTA), Dipentaerythitol Penta-acrylate (DiPEP).

A first or radical composition may comprise one or more free radical polymerizable components and a cationic photoinitiator, and be devoid of or substantially free of cationic polymerizable compounds or able to undergo cationic polymerization within the first composition. The free-radical polymerizable component(s) may be present in the first, i.e. radical composition in a concentration from about 50% to about 99% by weight of the total first composition. In some embodiments, free-radical polymerizable components may be present in the first composition in an amount above 85% by weight of the total first composition. An exemplary radical composition may include Epoxyacrylate oligomer (PH3016) in concentration of from about 30% to about 50% by weight of the total radical composition (e.g. about 50%), Phenoxya-crylate (SR339) in a concentration of from about 10% to about 70% by weight of the total radical composition (e.g. about 50%).

The first composition may further comprise hydroxyl containing components, which do not polymerize in the absence of a cationic photopolymerizable component such as epoxy.

Cationic Polymerizable Compounds

The second or cationic composition according to embodiments of the invention contains one or more cationically and optionally also non-cationically polymerizable components. The cationically polymerizable components may include epoxy, caprolactam, caprolactone, oxetane, vinyl ether. Non-limiting examples of epoxy compounds include Bis-(3,4 cyclohexylmethyl) adipate, 3,4-epoxy cyclohexylmethyl-3,4-epoxycyclohexyl carboxylate, 1,2 epoxy-4-vinylcyclohexane, 1,2-epoxy hexadecane and 3,4-epoxy cyclohexyl-methyl-3,4-epoxy cyclohexane carboxylate, which is available, for example, under the trade name UVACURE 1500 from Cytec Surface Specialties SA/NV (Belgium) and mono or multifunctional silicon epoxy resins such as PC 1000 which is available from Polyset Company (USA).

The cationic polymerizable compound(s) may be present in the second composition in concentration from about 10% to about 100% by weight of the total second composition. In some embodiments, the cationic polymerizable compound(s) may be present in the second composition in a concentration from about 50% to about 95% by weight of the total second composition. In a further embodiment the cationic polymerizable components in the second composition may be present in a concentration of about 85% to about 95% by weight of the total second composition.

Free Radical Polymerization Initiators

The free radical polymerization photoinitiator or in short the free radical photoinitiator may be a UV free radical initiator that will start a free radical polymerization reaction when exposed to radiation in the UV light spectrum. The photoinitiator may be a single compound or a combination of two or more compounds, which form an initiating system. Each of the first and second compositions of both may include one or more radical photo-initiators. The radical photo-initiator of the first composition and of the second composition may be the same or different.

The radical photo-initiator may be a compound that produces a free radical on exposure to radiation such as ultraviolet or visible radiation and thereby initiates a polymerization reaction. Non-limiting examples of some suitable photo-initiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BA-PO's); benzoins and bezoin alkyl ethers such as benzoin, benzoin methyl ether and benzoin isopropyl ether and the like. Examples of photo-initiators are bisacylphosphine oxide (BAPO's), marketed by Ciba under the trade name I-819.

The free-radical photo-initiator may be used alone or in combination with a co-initiator. Co-initiators are used with initiators that need a second molecule to produce a radical that is active in the UV-systems. Benzophenone is an example of a photoinitiator that requires a second molecule, such as an amine, to produce a curable radical. After absorbing radiation, benzophenone reacts with a ternary amine by hydrogen abstraction, to generate an alpha-amino radical which initiates polymerization of acrylates.

Non-limiting examples of suitable UV free radical initiators are 2,2-dimethoxy-2-phenylacetophenone which is available under the trade name IRGACURE I-651 from Ciba Specialty Chemicals (Switzerland), and 2,2-Diethoxyacetophenone available under the trade name Genocure [DEAP] from Rahn AB/Gmbh (Switzerland/Germany). Alpha-hydroxy ketones including Darocure 1173, Irgacure 184, Irgacure 2959 available from Ciba Specialty Chemicals (Switzerland) can be also used. Acyl phosphines including Darocur TPO and Irgacure 819 (Ciba Specialty Chemicals (Switzerland)) are less preferable. Alternatively, the free radical initiator may be an initiator that will start a free radical reaction when exposed to radiation at any suitable wavelength, such as visible light.

The free radical initiator may be present in the first composition in a concentration from about 0.5% to about 5% by weight of the total first composition. In some embodiments, the free radical initiator may be present in the first composition in an amount from about 1% to about 3% by weight of the total first composition. In some embodiments, the free radical initiator may be additionally present in the second composition that contains the cationic polymerizable substance in an amount from about 0.5% to about 5% by weight of the total second composition. In some embodiments, the free radical initiator may be present in the second composition in an amount from about 1% to about 3% by weight of the total second composition.

Cationic Polymerization Initiators

Suitable cationic photo-initiators for the present invention include compounds which form aprotic acids or Bronstead acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulfonium salts, triarylselenonium salts and the like. In some embodiments, a cationic photo-initiator may be a mixture of triarylsulfonium hexafluoroantimonate salts marketed by Lambson UVI 6976. The cationic polymerization phoinitiator or in short the cationic photoinitiator may be a UV cationic polymerization initiator that will start a cationic polymerization reaction when exposed to radiation in the UV light spectrum. Suitable photoinitiators include, for example, those compounds which form aprotic Brønsted acids upon exposure to UV light. The photoinitiator may be a single compound or a combination of two or more compounds, which form an initiating system.

Onium salts constitute a useful class of cationic photoinitiators. Triaryl Sulfonium (TAS) or diaryliodonium salts are important representatives of this class of photoinitiators. A non-limiting example of a suitable initiator is P-(octyloxyphenyl)phenyliodonium hexafluoroantimonate available under the trade name UVACURE 1600 from Cytec Company (USA). Alternatively, the cationic initiator may be an initiator that will start a cationic reaction when exposed to radiation at any suitable wavelength, such as visible light. Non-limiting examples of cationic initiators are Iodonium, (4-methylphenyl)(4-(2-methylpropyl)phenyl)-hexafluorophosphate known as Irgacure 250 or Irgacure 270 available from Ciba Speciality Chemicals (Switzerland), Mixed arylsulfonium hexafluoroantimonate salts known as UVI 6976 and 6992 available from Lambson Fine Chemicals (England), Diaryliodonium Hexafluoroantimonate known as PC 2506 available from Polyset Company (USA), (Tolylcumyl) iodonium tetrakis (pentafluorophenyl) borate known as Rhodorsil® Photoinitiator 2074 available from Bluestar Silicones (USA), Iodonium bis(4-dodecylphenyl)-(OC-6-11)-hexafluoroantimonate known as Tego PC 1466 from Evonik Industries AG (Germany).

The cationic photoinitiator may be present in the first composition in a concentration from about 0.2% to about 7% based on the total weight of the first composition. In some embodiments, the cationic initiator may be present in the first composition from about 2% to about 4% by weight of the total first composition.

Cationic Photosensitizers

The efficiency of the photopolymerization process is strongly dependent on the overlap between the emission spectrum of the UV light source and the absorption spectrum of the photoinitiator. As the emission spectrum of normally used medium pressure mercury lamp does not necessarily optimally fit the excitation peak of iodonium salts, a sensitizer having an absorption spectrum different to that of the photoinitiator may be added to the composition. A variety of compounds can be used as photosensitizers in a cationic system including, for example, heterocyclic and fused ring-aromatic hydrocarbons. Non-limiting examples of cationic photosensitizers include dibutoxyanthrancene, phenothiazine, anthracene, curcumin and 2-isopropyl thioxanthone.

Toughening Agents for the Cationic Composition

Epoxy resins which are polymerized in a cationic mechanism might be brittle and notch sensitive. Thus, toughening agents may be added to the cationic composition. Toughness modification of epoxy resins may be carried out in different ways including incorporation of an elastomeric dispersed phase and/or incorporation of components undergoing phase separation during curing. Non-limiting examples of a toughening agent include epoxidized polybutadiene (PB3600 (Daicel Corp., Japan)), Wax Wacker 350 (Wacker Chemie AG, Germany), which is polydimethylsiloxane-polycaprolactone-polydimethylsiloxane ABA triblockblock copolymer. The toughening agent may be present in the second composition in a concentration from about 2% to about 10% based on the total weight of the second composition.

Embodiments of the invention may be carried into practice by various ways and some illustrative embodiments will be described in the following examples.

EXAMPLES

Exemplary first compositions, i.e. free-radical compositions and exemplary second compositions, i.e. cationic compositions were prepared. The compositions were deposited in various print patterns and composition ratios by an Objet Connex500™ 3D printing system of Stratasys Ltd. to form Izod-type test specimens (ASTM D 256-06). Following post treatment (for example, heating), various mechanical and thermo-mechanical properties of the test specimens were tested.

Listed below in Table 1 are different exemplary chemical components and their respective trade names, for the free radical (first) composition.

TABLE 1

Components of Free Radical (First) Composition

| Trade Name | Chemical Type | Function in the formulation | Supplier |
| --- | --- | --- | --- |
| Photomer 6010 | Urethane Acrylate Oligomer | Oligomer | Cognis |
| SR-339 | Phenoxy ethyl Acrylate | Monomer | Sartomer |
| SR-351 | Trimethylol propane triacrylate | Cross-linker | Sartomer |
| UVI-6976 | Mixed Triarylsulfonium Hexafluoroantimonate Salts | Cationic photo-initiator | Synasia |
| Photomer 4028F | Bis Phenol A Ethoxylated Diacrylate | Acrylic oligomer | Cognis |
| SR506D | Isobornyl acrylate | Acrylic Monomer | Sartomer |
| SR833S | Tricyclodecane dimethanol diacrylate | Acrylic Monomer | Sartomer |
| CHVE | 1,4-cyclohexane dimethanol divinyl ether | Vinyl Ether Monomer | ISP |
| V-CAP | Vinylcaprolactam | Monomer | ISP |
| Ebecryl 350 | Silicon acrylated oligomer | Phase separation promoter | UCB Chemicals |
| Trimethylolpropane tri(3-mercaptopropionate) | Sulfur-containing compound | Crosslinker | Bruno Bock Chemische Fabrik HMBH & CO. |
| Uvacure 1600 | P-(octyloxyphenyl) phenyliodonium hexafluoroantimonate | Cationic photoinitiator | Cytec |
| Irgacure I-651 | Alpha, alpha-dimethoxy alpha phenylacetophenone | Radical photoinitiator | CIBA |
| TPO | Diphenyl (2,4,6 trimethylbenzoyl) phosphine oxide | Radical photoinitiator | BASF |
| BR 970 | Urethane diacrylate | Acrylic oligomer | IGM |
| Speedcure ITX | 2-isopropylthioxanthone and 4-isopropylthioxanthone | Cationic photosensitizer | Lambson |
| BYK 3570 | Acrylfunctional polyester modified polydimethlsiloxane | Additive | BYK |
| Curcumin | 1,6-Heptadiene-3,5-dione, 1,7-bis(4-hydroxy-3-methoxyphenyl)- | Cationic photosensitizer | Axowin |
| DBS-C21 | Carbinol hydroxyterminated PDMS | Toughener | Gelest |

Non-limiting examples of possible free radical polymerizable compositions according to embodiments of the invention are shown in Table 2.

TABLE 2

Free Radical (First) Compositions

| Component (Trade name) | Function | A | B | C | D | E | F | G |
|---|---|---|---|---|---|---|---|---|
| Photomer 4028 | Bisphenol A ethoxylate diacrylate | X | X | X | X | X |   | X |
| SR 339 | Phenoxyacrylate | X | X |   | X | X |   |   |
| SR 833S | Tricyclodecane dimethanol diacrylate | X | X | X | X | X | X | X |
| TPO | Radical photoinitiator | X | X |   |   |   |   |   |
| UVI 6976 | Cationic photoinitiator (sulfonium salt) | X |   |   |   |   |   |   |
| Uvacure 1600 | Cationic photoinitiator (iodonium salt) |   |   | X | X | X | X | X |
| Irgacure 651 | Radical photoinitiator |   |   | X | X | X | X | X |
| BR 970 | Aliphatic polyester urethane acrylate |   |   |   |   |   | X |   |
| SR 506D | Isobornyl acrylate |   |   |   |   |   | X | X |
| DBS-C21 | Carbinol hydroxyterminated PDMS |   |   |   |   |   |   | X |

Listed below in Table 3 are different exemplary chemical components and their respective trade names, for the cationic (second) composition.

TABLE 3

Components of Cationic (Second) Composition

| Trade Name | Chemical Type | Function in the formulation | Supplier |
|---|---|---|---|
| Photomer- 6010 | Urethane Acrylate Oligomer | Oligomer | Cognis |
| SR-339 | Phenoxy ethyl Acrylate | Monomer | Sartomer |
| SR -351 | Trimethylol propane triacrylate | Cross-linker | Sartomer |
| SR506D | Isobornyl acrylate | Acrylic Monomer | Sartomer |
| SR833S | Tricyclodecane dimethanol diacrylate | Acrylic Monomer | Sartomer |
| Uva Cure 1500 | 3,4 Epoxycyclohexylmethyl-3,4-epoxycyclohexylcarboxylate | Epoxy oligomer | Cytec |
| CHVE | 1,4-cyclohexane dimethanol divinyl ether | Vinyl Ether Monomer | ISP |
| Irgacure I-651 | Alpha, alpha-dimethoxy alpha phenylacetophenone | Radical photoinitiator | CIBA |
| TPO | Diphenyl (2,4,6 trimethylbenzoyl) phosphine oxide | Radical photoinitiator | BASF |
| Photomer 4028F | Bisphenol A ethoxylate diacrylate | Acrylic oligomer | Cognis |
| PC 1000 | Difunctional silicon-containing epoxy resin | Cationic monomer | Polyset |
| Speedcure ITX | 2-isopropylthioxanthone and 4-isopropylthioxanthone | Cationic photosensitizer | Lambson |
| BYK 3570 | Acrylfunctional polyester modified polydimethlsiloxane | Additive | BYK |
| Curcumin | 1,6-Heptadiene-3,5-dione, 1,7-bis(4-hydroxy-3-methoxyphenyl)- | Cationic photosensitizer | Axowin |
| Celloxide 3000 | Limonene dioxide | Cationic monomer | Daicel |
| PC 2000 | Difunctional silicon-containing epoxy resin | Cationic oligomer | Polyset |
| Anthracene | Photosensitizer | Photosensitizer | Sigma-Aldrich |

Non-limiting examples of possible cationic compositions according to embodiments of the invention are shown in Table 4.

TABLE 4

Cationic (Second) Compositions

| Component (Trade name) | Function | A | B | C | D | E | F | G |
|---|---|---|---|---|---|---|---|---|
| Uvacure 1500 | Cycloaliphatic epoxy resin | X | X | X | X | X | X | X |
| Speedcure ITX | Photosensitizer |   | X | X | X |   |   | X |
| Irgacure 651 | Radical photoinitiator |   |   |   | X | X | X | X | X |
| Celloxide 3000 | Limonene dioxide |   |   |   | X |   |   |   |
| PC 2000 | Difunctional silicon-containing epoxy resin |   |   |   | X |   |   |   |
| Curcumin | Photosensitizer |   |   |   |   | X |   |   |
| PC 1000 | Difunctional silicon-containing epoxy resin |   |   |   |   |   | X | X |
| Anthracene | Photosensitizer |   |   |   |   | X |   |   |

Exemplary first and second compositions were prepared by putting weighted amounts of the components in a plastic container and heating to a temperature of 85° C. Then, the components were mixed at room temperature using a high shear mixer such as shear mixer available from Charles Ross & Company, USA until the ingredients were dissolved and a homogeneous composition was obtained. The final composition was filtered using a 5-micron filter to remove non-soluble impurities. The viscosity of the composition was determined with a Brookfield DVE type viscometer available from Brookfield Company, USA at a temperature of 75° C. for 15 minutes using a cylindrical spindle S00 rotating at 30 RPM.

The compositions were jetted using an Objet Connex500™ 3D printing system of Stratasys Ltd. in a Digital Material (DM) printing mode to form test samples e.g. Izod-type test specimens (ASTM D 256-06) in several ratios and patterns between the first and second composition as detailed below. The test samples were heated using an oven in either a relatively short process of heating the sample for an hour at 90° C. (short post-printing process) or a longer process that included gradually heating the samples in an oven for 5 hours starting from 80° C. until 120° C. at intervals of 30 minutes followed by heating the sample at a temperature of 120° C. for another hour and then gradually cooling to a temperature of 60° C. (long post-printing process).

The thermo-mechanical properties of the test samples of the polymerized combined compositions were determined by measuring the impact strength and Heat deflection temperature according to respective ASTM D0256-06 and ASTM 648-06 procedures. The impact strength of the specimens was measured by a Resil 5.5 J type instrument (CEAST Series, INSTRON, USA using an Izod impact test (notched Izod) according to the ASTM International organization D-256 standard. The Heat deflection temperature (HDT) of the samples was determined according to the ASTM International organization D-648 standard. The specimens were tested using a HDT 3 VICAT instrument (CEAST Series, INSTRON, USA). Glass Transition Temperature (Tg) was determined by a DMA Q800 measurement device (TA Instruments (Belgium)). Modulus, strength and elongation were obtained using Lloyd LR 5 k instruments (Lloyd Instruments, UK).

In the following examples, component designations are in weight percentages. The radical compositions are acrylate-based compositions and the cationic compositions are epoxy-based compositions. The components of each of the compositions were mixed to produce homogenous liquid compositions.

Example 1

| Trade name | Function | Radical/acrylic composition | Cationic/epoxy composition |
| --- | --- | --- | --- |
| Photomer 4028F | Bisphenol A ethoxylate diacrylate | 48 | |
| SR 339 | Phenoxyacrylate | 10 | |
| SR 833S | Tricyclodecane dimethanol diacrylate | 38 | |
| Uvacure 1600 | Cationic photoinitiator (Iodonium salt) | 3 | |
| Darocur TPO | Radical photoinitiator | 1 | |
| Uvacure 1500 | Epoxy-based compound | | 99 |
| Speedcure ITX | Photosensitizer | | 1 |
| Total | | 100 | 100 |

In Example 1, the radical composition includes both a radical photoinitiator and a cationic photoinitiator, and the cationic composition does not include any photoinitiators.

Test samples were prepared by printing the compositions in a ratio of 50%:50% followed by the short post-printing heating process.

The following properties were measured:

| | |
| --- | --- |
| HDT | 128.2 ± 0.4° C. |
| Flexural strength | 112 ± 3 MPa |
| Flexural modulus | 3030 ± 50 Mpa |
| Impact | 13 J/m$^2$ |

Additional test samples were prepared by printing the compositions in a ratio of 40%:60% (free-radical composition:cationic composition) followed by the long post-printing heating process.

Example 2

| Trade name | Function | Radical/acrylic composition | Cationic/epoxy composition |
| --- | --- | --- | --- |
| Photomer 4028F | Bisphenol A ethoxylate diacrylate | 46 | |
| SR 339 | Phenoxyacrylate | 9 | |
| SR 833S | Tricyclodecane dimethanol diacrylate | 37 | |
| UVI 6976 | Cationic photoinitiator (Sulfonium salt) | 8 | |
| Darocur TPO | Radical photoinitiator | | 1 |
| Uvacure 1500 | Epoxy-based compound | | 99 |
| Total | | 100 | 100 |

Test samples in three different patterns of a 50%:50% printing mode were prepared followed by the short post-printing treatment.

In the first sample, each layer included a 1:1 ratio in a "Chess board" homogenous pattern namely, 50% (by dots) of the layer was occupied by the acrylic composition and 50% of the layer was occupied by the epoxy composition. The combined polymerized material exhibits a "curling" tendency in the range of 1-2 mm and a Heat deflection Temperature of 88° C.

In the second sample, the compositions were printed in rows, e.g. one pixel wide, perpendicular to the scan direction. In this comparative example, deposition of the same two compositions in the same ratio (50:50 w/w) but in a different pattern results in a "curling" tendency of 22 mm, which is significantly higher than the "curling" produced by the "Chess Board" deposition pattern (1-2 mm) although the HDT remains substantially similar at 87° C.

In the third sample, the compositions were printed in rows, e.g. one pixel wide, parallel to the scan direction. In this example, the curling was measured at 20 mm and the HDT was 84° C.

Additional examples are given below marked as Example 3 and 4.

Example 3

| Trade name | Function | Radical/acrylic composition | Cationic/epoxy composition |
|---|---|---|---|
| Photomer 4028F | Bisphenol A ethoxylate diacrylate | 45 | |
| SR 339 | Phenoxyacrylate | 9 | |
| SR 833S | Tricyclodecane dimethanol diacrylate | 36 | |
| Darocure TPO | Radical photoinitiator | 2 | |
| UVI 6976 | Cationic photoinitiator (Sulfonium salt) | 8 | |
| Uvacure 1500 | Epoxy-based compound | | 100 |

Example 4

| Trade name | Function | Radical/acrylic composition | Cationic/epoxy composition |
|---|---|---|---|
| BR 970 | Aliphatic polyester urethane acrylate | 14 | |
| SR 9036 | Etoxylated (30) bispehnol A dimethacrylate | 20 | |
| AGI 1030 | Difunctional acrylic ester | 8.61 | |
| SR 506D | Isobornyl acrylate | 50 | |
| Uvacure 1600 | Cationic photoinitiator (Iodonium salt) | 2.77 | |
| BYK 3570 | Surfactant | 2.77 | |
| Irgacure 651 | Radical photoinitiator | 1.85 | 1.9 |
| Uvacure 1500 | Epoxy-based compound | | 93 |
| PC 1000 | Difunctional silicon-containing epoxy resin | | 4.8 |
| Speedcure ITX | Photosensitizer | | 0.3 |
| Total | | 100 | 100 |

Test samples were prepared by printing the composition combinations of each of examples 3 and 4 in a ratio of 50%:50% (free-radical composition:cationic composition) followed by the long post-printing heating process. These samples exhibit the following HDT AND Izod impact values.

| Property | Example 3 | Example 4 |
|---|---|---|
| Izod impact | <10 | 20-30 |
| HDT | 70 ± 1 C. | 77.9 ± 0.9 C. |

Various aspects of specific embodiments discussed herein may be combined with aspects from other embodiments. It will be appreciated by persons skilled in the art that the present invention is not limited by what has been particularly shown and described herein above. Rather the scope of the invention is defined by the claims that follow:

What is claimed is:
1. An inkjet printing method comprising:
selectively depositing by inkjet printing, layer by layer, a first composition and a second composition onto a receiving media from different dispensers to form polymerizable deposited layers,
wherein the first composition comprises one or more free-radical polymerizable compounds and a cationic photoinitiator and is devoid of compounds able to undergo cationic photopolymerization within the first composition,
wherein the second composition comprises one or more cationic polymerizable compounds and is devoid of cationic photoinitiators,
wherein at least one of the first and the second compositions comprises a radical photoinitiator; and
exposing the polymerizable deposited layers to actinic radiation to initiate, by the radical photoinitiator, polymerization of the one or more free-radical polymerizable compounds and to initiate, by the cationic photoinitiator, received from the first composition, polymerization of the one or more cationic polymerizable compounds received from the second composition.

2. The inkjet printing method of claim 1, wherein polymerized layers form a three-dimensional object.

3. The inkjet printing method of claim 1, wherein the first and second compositions are dispensed so as to form a substantially isotropic distribution within each of the polymerizable deposited layers.

4. The inkjet printing method of claim 1, wherein the first and second compositions are dispensed such that in each of the polymerizable deposited layers, a ratio between deposited droplets of the first composition and deposited droplets of the second composition is between about 25% first composition to about 75% second composition and about 75% first composition to about 25% second composition.

5. The inkjet printing method of claim 1, wherein the ratio in at least one layer of the polymerizable deposited layers is different from the ratio in at least one other of the polymerizable deposited layers.

6. The inkjet printing method of claim 1, wherein the first composition comprises at least one acrylic monofunctional monomer at a concentration of at least 20% by weight relative to the weight of the first composition and an acrylic oligomer at a concentration of at least 20% by weight relative to the weight of the first composition.

7. The inkjet printing method of claim 1, wherein the second composition comprises 3,4-Epoxy cyclohexyl methyl-3,4 epoxy cyclohexyl carboxylate at a concentration of at least 50% by weight relative to the weight of the second composition.

8. The inkjet printing method of claim 7, wherein the 3,4-Epoxy cyclohexyl methyl-3,4 epoxy cyclohexyl carboxylate constitutes above 90% by weight of the second composition.

9. The inkjet printing method of claim 1, wherein the cationic photoinitiator comprises Aryliodonium Hexafluoroantimonate.

10. The inkjet printing method of claim 1, wherein the second composition comprises acrylic polymerizable compounds.

11. The inkjet printing method of claim 1, wherein the cationic polymerizable compound is selected from cycloaliphatic epoxides, vinyl ethers, cyclic sulphides, lactones and siloxanes.

12. The inkjet printing method of claim 1, wherein the first composition further comprises one or more hydroxyl containing compounds, which do not polymerize in the absence of a cationic photopolymerizable compound.

* * * * *